(12) United States Patent
Pelletier et al.

(10) Patent No.: US 8,700,968 B2
(45) Date of Patent: *Apr. 15, 2014

(54) HARQ PROCESS UTILIZATION IN MULTIPLE CARRIER WIRELESS COMMUNICATIONS

(71) Applicant: Interdigital Patent Holdings, Inc., Wilmington, DE (US)

(72) Inventors: Benoit Pelletier, Roxboro (CA); Jean-Louis Gauvreau, La Prairie (CA); Diana Pani, Montreal (CA); Christopher R. Cave, Montreal (CA); Paul Marinier, Brossard (CA); In H. Kim, Norristown, PA (US); Philip J. Pietraski, Huntington Station, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/775,871

(22) Filed: Feb. 25, 2013

(65) Prior Publication Data

US 2013/0170457 A1 Jul. 4, 2013

Related U.S. Application Data

(63) Continuation of application No. 13/567,746, filed on Aug. 6, 2012, now Pat. No. 8,386,874, which is a continuation of application No. 12/429,011, filed on Apr. 23, 2009, now Pat. No. 8,239,721.

(60) Provisional application No. 61/048,149, filed on Apr. 25, 2008, provisional application No. 61/086,973, filed on Aug. 7, 2008.

(51) Int. Cl.
*G06F 11/00* (2006.01)

(52) U.S. Cl.
USPC .......................................... 714/749; 714/748

(58) Field of Classification Search
USPC ........... 714/749, 748, 712; 718/101, 102, 107
See application file for complete search history.

(56) References Cited

U.S. PATENT DOCUMENTS 7,940,771 B2    5/2011  Lee et al.
2008/0133995 A1  6/2008  Lohr et al.
(Continued)

FOREIGN PATENT DOCUMENTS

EP      1 901 494      3/2008
WO      2007/021122    2/2007

OTHER PUBLICATIONS

Ericsson, "L2 Architecture for Dual Carrier HSDPA Operation", 3GPP TSG-RAN WG2 #62bis, Tdoc R2-083125, (Warsaw, Poland, Jun. 30-Jul. 4, 2008).

(Continued)

*Primary Examiner* — Dieu-Minh Le
(74) *Attorney, Agent, or Firm* — Volpe and Koenig, P.C.

(57) ABSTRACT

Methods and apparatus utilize hybrid automatic repeat request (HARQ) transmissions and retransmissions that are usable on multiple carriers, i.e. joint HARQ processes. For example, a downlink (DL) shared channel transmission of a joint HARQ process is received on one of the carriers. A first part of an identity of the joint HARQ process is determined by using HARQ process identity data received on a shared control channel. A second part of the joint HARQ process identity is determined using additional information. The joint HARQ process identity is then determined by combining the first part and the second part. A WTRU is provided that is configured to receive the DL shared channel and to make the aforementioned determinations. A variety of other methods and apparatus configurations are disclosed for utilizing joint HARQ processes, in particular in the context of DC-HSDPA.

10 Claims, 9 Drawing Sheets

(56) References Cited

U.S. PATENT DOCUMENTS

| | | | |
|---|---|---|---|
| 2009/0265599 A1 | 10/2009 | Chae et al. | |
| 2010/0058135 A1* | 3/2010 | Tseng | 714/748 |
| 2010/0223524 A1* | 9/2010 | Duggan et al. | 714/751 |
| 2011/0103327 A1 | 5/2011 | Lee et al. | |
| 2011/0105162 A1 | 5/2011 | Kim et al. | |

OTHER PUBLICATIONS

Nokia et al., "Considerations on the dual cell HSDPA operation," 3GPP TSG-RAN WG1 Meeting #52bis, R1-081434 (Mar. 31-Apr. 4, 2008).

Qualcomm Europe, 3, et al., "Feasibility Study on Dual-Cell HSDPA Operation", 3GPP TSG RAN #39, RP-080148, (Puerto Vallarta, Mexico, Mar. 4-7, 2008).

Third Generation Partnership Project, "Technical Specification Group Radio Access Network; Medium Access Control (MAC) Protocol Specification (Release 6)," 3GPP TS 25.321 v6.15.0 (Mar. 2008).

Third Generation Partnership Project, "Technical Specification Group Radio Access Network; Medium Access Control (MAC) Protocol Specification (Release 6)," 3GPP TS 25.321 v6.18.0 (Mar. 2009).

Third Generation Partnership Project, "Technical Specification Group Radio Access Network; Medium Access Control (MAC) Protocol Specification (Release 7)," 3GPP TS 25.321 v7.8.0 (Mar. 2008).

Third Generation Partnership Project, "Technical Specification Group Radio Access Network; Medium Access Control (MAC) Protocol Specification (Release 7)," 3GPP TS 25.321 v7.12.0 (Mar. 2009).

Third Generation Partnership Project, "Technical Specification Group Radio Access Network; Medium Access Control (MAC) Protocol Specification (Release 8)," 3GPP TS 25.321 v8.1.0 (Mar. 2008).

Third Generation Partnership Project, "Technical Specification Group Radio Access Network; Medium Access Control (MAC) Protocol Specification (Release 8)," 3GPP TS 25.321 v8.5.0 (Mar. 2009).

Third Generation Partnership Project, "Technical Specification Group Radio Access Network; Physical Layer Procedures (FDD) (Release 7)." 3GPP TS 25.214 v7.8.0 (Mar. 2008).

Third Generation Partnership Project, "Technical Specification Group Radio Access Network; Physical Layer Procedures (FDD) (Release 7)." 3GPP TS 25.214 v7.11.0 (Mar. 2009).

Third Generation Partnership Project, "Technical Specification Group Radio Access Network; Physical Layer Procedures (FDD) (Release 8)." 3GPP TS 25.214 v8.1.0 (Mar. 2008).

Third Generation Partnership Project, "Technical Specification Group Radio Access Network; Physical Layer Procedures (FDD) (Release 8)." 3GPP TS 25.214 v8.5.0 (Mar. 2009).

Third Generation Partnership Project, "Technical Specification Group Radio Access Network; Multiplexing and Channel Coding (FDD) (Release 8)," 3GPP TS 25.212 V8.1.0 (Mar. 2008).

Third Generation Partnership Project, "Technical Specification Group Radio Access Network; Multiplexing and Channel Coding (FDD) (Release 8)," 3GPP TS 25.212 V8.2.0 (May 2008).

Third Generation Partnership Project, "Technical Specification Group Radio Access Network; Multiplexing and Channel Coding (FDD) (Release 8)," 3GPP TS 25.212 V8.5.0 (May 2009).

Third Generation Partnership Project, "Technical Specification Group Radio Access Network; Multiplexing and Channel Coding (FDD) (Release 6)," 3GPP TS 25.212 V6.7.0 (Mar. 2009).

* cited by examiner

HARQ PROCESS UTILIZATION IN MULTIPLE CARRIER WIRELESS COMMUNICATIONS

This application is a continuation of U.S. patent application Ser. No. 13/567,746, filed Aug. 6, 2012, which is a continuation of U.S. patent application Ser. No. 12/429,011, filed Apr. 23, 2009, now U.S. Pat. No. 8,239,721, which claims priority from U.S. Provisional Application 61/048,149, filed Apr. 25, 2008, and U.S. Provisional Application 61/086,973, filed Aug. 7, 2008, which are incorporated herein by reference as if fully set forth.

FIELD OF INVENTION

This application is related to wireless communication apparatus and methods. In particular, methods and apparatus for wireless communications that utilize hybrid automatic repeat request (HARQ) transmissions and retransmissions.

BACKGROUND

Evolved High-Speed Packet Access (HSPA) is a mobile data protocol defined in the 3rd Generation Partnership Project (3GPP) release 7. Evolved HSPA includes increased data speed on the downlink (DL) from a base station (BS) and on the uplink (UL) to a BS, lower state transition latency, and longer battery life for mobile terminals. Evolved HSPA (HSPA Evolution) provides data rates up to 42 Mbit/s on the DL with multiple input multiple output (MIMO) technologies and 11.52 Mbit/s on the UL with higher order modulation.

The evolution of HSPA towards a higher throughput and lower latencies requires improvements to the physical layer, as well as the architecture. One improvement is the use of a Dual Cell-High Speed Downlink Packet Access (DC-HSDPA) to increase the DL capacity and to support hot spot activities.

DC-HSDPA introduces a second DL carrier to be used as a second high speed downlink packet access (HSDPA) channel. In DC-HSDPA, the dual cell operation applies to the high-speed downlink shared channel (HS-DSCH). In addition, the dual cells of DC-HSDPA are associated with a single BS and operate on different carriers. For example, one cell operates on an anchor carrier and the other cell operates on a supplementary carrier where both carriers are transmitted by the same BS. Further, in Release 8 of the HSPA specifications, the two cells of DC-HSDPA operate with a single transmit antenna and the two cells operate over adjacent carriers in the same frequency band, although in future releases the same band restriction may be removed.

In such a dual-cell HSDPA network, BSs, referred to as Node-Bs in 3GPP, communicate to mobile terminals or other wireless transmit/receive units (WTRUs) over two distinct carriers simultaneously. This results in doubling the bandwidth, doubling the peak data rate available to WTRUs. It also has the potential to increase the network efficiency by means of fast scheduling and fast channel feedback over two carriers.

As with conventional wireless apparatus, network stations and WTRUs for Dual-Cell HSDPA communications are configured with multi-layer communication processing components that implement a first physical layer (L1) that transmits and receives the wireless signals, a medium access control (MAC) layer (L2) and various higher layers.

In Dual-Cell communications, each WTRU is assigned a so-called anchor carrier. The anchor carrier for the WTRU carries dedicated and shared DL control channels, such as, for example, a fractional dedicated physical channel (F-DPCH), an enhanced dedicated channel (E-DCH) hybrid automatic repeat-request (ARQ) indicator channel (E-HICH), an E-DCH relative grant channel (E-RGCH), an E-DCH absolute grant channel (E-AGCH), a common pilot channel (CPICH), etc. In addition anchor carrier for the WTRU carries data channels, such as a HS-DSCH. The optional supplementary or secondary carrier that serves the HS-DSCH cell carries data channels and a CPICH for the WTRU. The anchor carrier for a given WTRU may correspond to the supplementary carrier for another WTRU.

FIG. 1 shows an example evolved HSPA communications 100 using a DC-HSDPA setup. Two DL carriers are shown, an anchor carrier A and a supplementary carrier B transmitted by a base station 101 to a WTRU 102 over the same geographic area, along with a single UL carrier A transmitted by the WTRU. The UL carrier A is associated with the anchor DL carrier A and also provides feedback associated with the second supplement DL carrier B.

Although only a single WTRU is illustrated, the DL carriers may be concurrently utilized for wireless communications with other WTRUs. As noted above the supplementary DL carrier B for WTRU 102, may be being used as an anchor carrier for another WTRU.

During low utilization periods of DC-HSDPA, it is possible that the second carrier may not be used, potentially underutilizing resources. This provides an opportunity to use the second carrier transmission as a diversity channel when it is not fully utilized for DL transmissions.

The typical number of HARQ processes used for wireless communication is sixteen. With Dual-Cell HSDPA, there are two alternatives for associating each carrier to hybrid ARQ (HARQ) entities: (1) Using separate HARQ entities, each HARQ entity is assigned to a given carrier (e.g., 8 HARQ processes per carrier) and (2) using joint HARQ entities, the HARQ entities are not linked to a specific carrier (e.g., all 16 HARQ processes are available to both carriers). In the first alternative, the HARQ retransmissions can only occur over the same carrier. In the second alternative, the HARQ retransmissions can be transmitted over a different carrier, if desired.

FIG. 2 illustrates an example of a Universal Terrestrial Radio Access Network (UTRAN) side MAC-enhanced high speed (MAC-ehs) architecture for DC-DSDPA with separate HARQ entities. FIG. 3 illustrate an example of a UTRAN side MAC-ehs architecture for DC-HSDPA with a joint HARQ entity.

Using separate HARQ entities has some implementation advantages. By assigning each carrier to a HARQ entity, no change is required in Layer 1 (L1) specifications and the current high speed shared control channel (HS-SCCH) type 1 can be used without modification. However, doing so reduces the fast scheduling gain, i.e. the gain obtained by exploiting the fast channel variations independently over the two carrier frequency, since retransmissions are then constrained to occur on the same carrier as the initial transmission. Also, in cases where the supplementary carrier is disabled, any ongoing HARQ transmission on the supplementary carrier would be blocked. This implies that either the corresponding HARQ entities have to be flushed, resulting in loss of data and additional transmission delays, or that a new more complex procedure needs to be devised to avoid losing data.

When using joint HARQ entities on the other hand, the scheduler can take full advantage of the varying radio conditions and, in addition, all active HARQ processes can be maintained when de-activating the supplementary carrier. Therefore, there are significant advantages to using joint HARQ entities.

While using joint HARQ entities is advantageous, it requires additional signaling. The existing HS-SCCH type 1 only carries three bits for HARQ process information. This is insufficient to address the 16 HARQ processes that are typically available with joint HARQ entities.

Under Long Term Evolution-Advanced (LTE-A) standards, carrier aggregation and support of flexible bandwidth arrangement may be supported. This allows DL and UL transmission bandwidths to exceed 20 MHz. In Release 8 (R8) LTE, for example, a 40 MHz bandwidth is specified. This improvement will also allow for more flexible usage of the available paired spectrum. For example, R8 LTE is limited to operate in symmetrical and paired FDD mode, e.g., DL and UL must have the same transmission bandwidth, e.g., 10 MHz, 20 MHz, and so on. However, LTE-A should be able to support operation in asymmetric configurations such as a 10 MHz DL carrier paired with a 5 MHz UL carrier. In addition, composite aggregate transmission bandwidths should also possible with LTE-A, e.g., a first 20 MHz DL carrier and a second 10 MHz DL carrier paired with a 20 MHz UL carrier and so on. Additionally, composite aggregate transmission bandwidths may not necessarily be contiguous in frequency domain, e.g., the first 10 MHz so-called component carrier in the above example could be spaced by 22.5 MHz in the DL band from the second 5 MHz DL component carrier. Alternatively, operation in contiguous aggregate transmission bandwidths should also be possible, e.g., a first 15 MHz DL component carrier is aggregated with another 15 MHz DL component carrier and paired with a 20 MHz UL carrier.

In a LTE-A system, the physical downlink control channels (PDCCHs) or Downlink Control Information (DCI) messages contained therein carrying the assignment information can be separately transmitted for the component carriers containing the accompanying physical downlink shared channel (PDSCH) transmissions. For example, if there are two component carriers, there are two separate DCI messages on each component carrier corresponding to the PDSCH transmissions on each component carrier respectively. This is referred as separate PDCCH coding.

Alternatively, the two separate DCI messages for a WTRU may be sent on one component carrier, even though they may pertain to accompanying data, or PDSCH transmissions on different component carriers. The separate DCI messages of PDCCHs for a WTRU or a group of WTRUs can be transmitted in one or in multiple carriers, and not necessarily all of them on every component carrier. This is referred to as an anchor carrier with separate PDCCH coding.

The DCI carrying the assignment information for PDSCH(s) on more than one component carrier can be encoded jointly and carried by one single joint DCI control message, or PDCCH message. This is referred to as joint PDCCH coding. One approach for the dynamic support of multicarrier assignment schedules is to have a variable size DCI format with a common DCI part and a carrier specific part. The common DCI part contains a field indicating which component carrier is being assigned in the current subframe and implicitly which carrier specific DCI format will follow. The common DCI format may also contains information that could apply to all carriers such as Hybrid ARQ process.

Accordingly, a method and apparatus configured to provide the necessary mechanisms to signal the HARQ process information in a DC-HSDPA system or LTE-A system with joint HARQ entities and to effectively utilize the unused resources in supplementary component carriers to expand system performance and reliability is desired.

SUMMARY

Methods and apparatus are provided for utilizing hybrid automatic repeat request (HARQ) transmissions and retransmissions that are usable on multiple carriers, i.e. joint HARQ processes, for a wireless communication of data. In one embodiment of a method, a downlink (DL) shared channel transmission of a joint HARQ process is received on one of carriers. A first part of an identity of the joint HARQ process is determined by using HARQ process identity data received on a shared control channel. A second part of the joint HARQ process identity is determined using additional information. The joint HARQ process identity is then determined by combining the first part and the second part.

A WTRU is provided that is configured to receive the DL shared channel and to make the aforementioned determinations. A variety of other methods and apparatus configurations are disclosed for utilizing joint HARQ processes, in particular in the context of DC-HSDPA.

BRIEF DESCRIPTION OF THE DRAWINGS

A more detailed understanding may be had from the following description, given by way of example in conjunction with the accompanying drawings.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. A WTRU may be configured to operate in one or more warless systems including, but not limited to, a Long Term Evolution (LTE) environment or a Universal Mobile Telecommunications System (UMTS). When referred to hereafter, the terminology "base station" includes but is not limited to a Node-B, evolved universal terrestrial radio access (E-UTRA) Node-B (eNB), a site controller, an access point (AP), or any other type of interfacing device or network station capable of operating in a wireless environment. When referred to hereafter, the term "carrier" refers to a carrier frequency. Although many examples refer to combining two carriers, there is no inherent limitation on the number of carriers.

Figure 1:
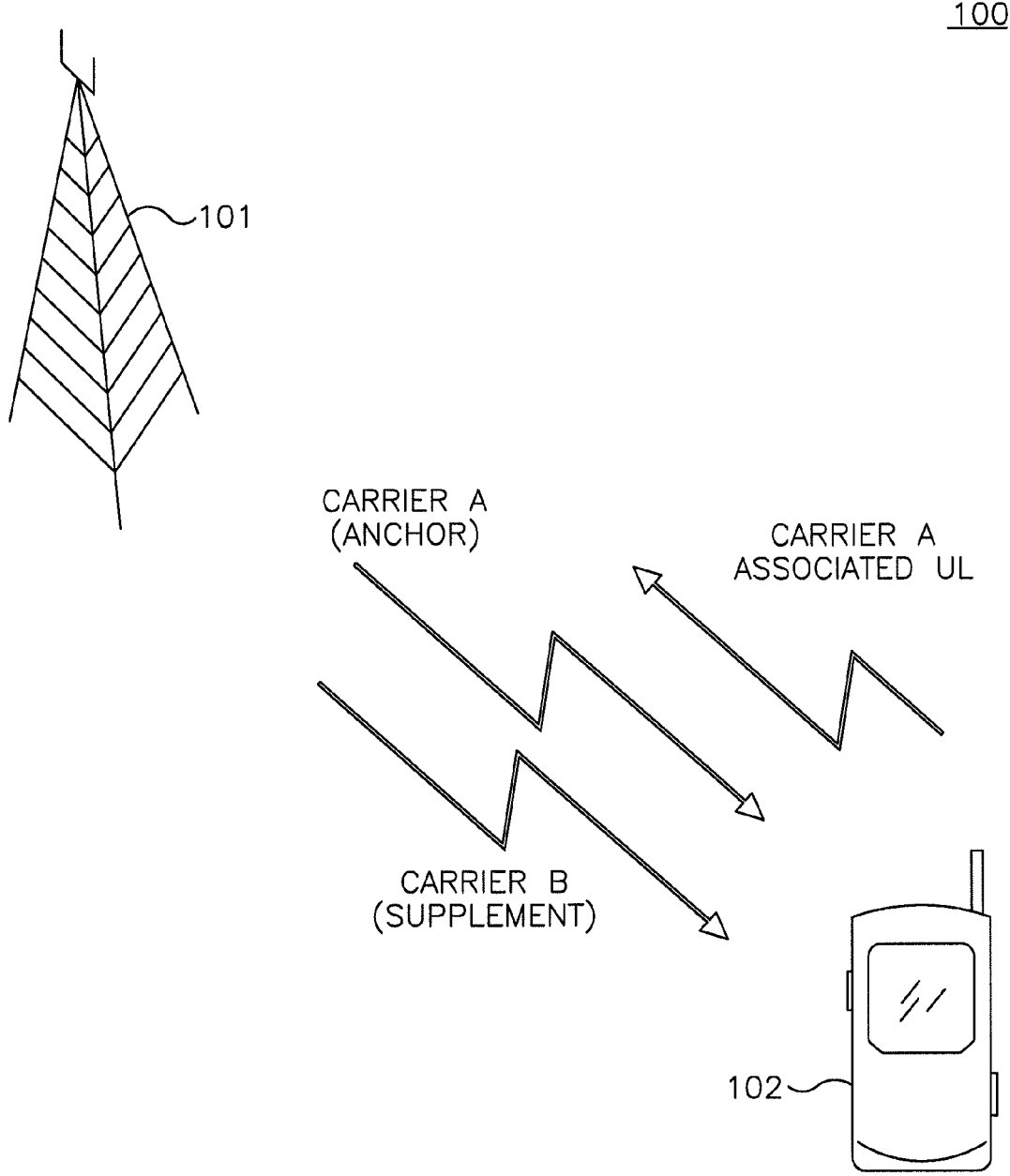
FIG. 1 is a diagram of a Dual-Cell High-Speed Downlink Packet Access (DC-HSDPA) wireless communication.
Figure 2:
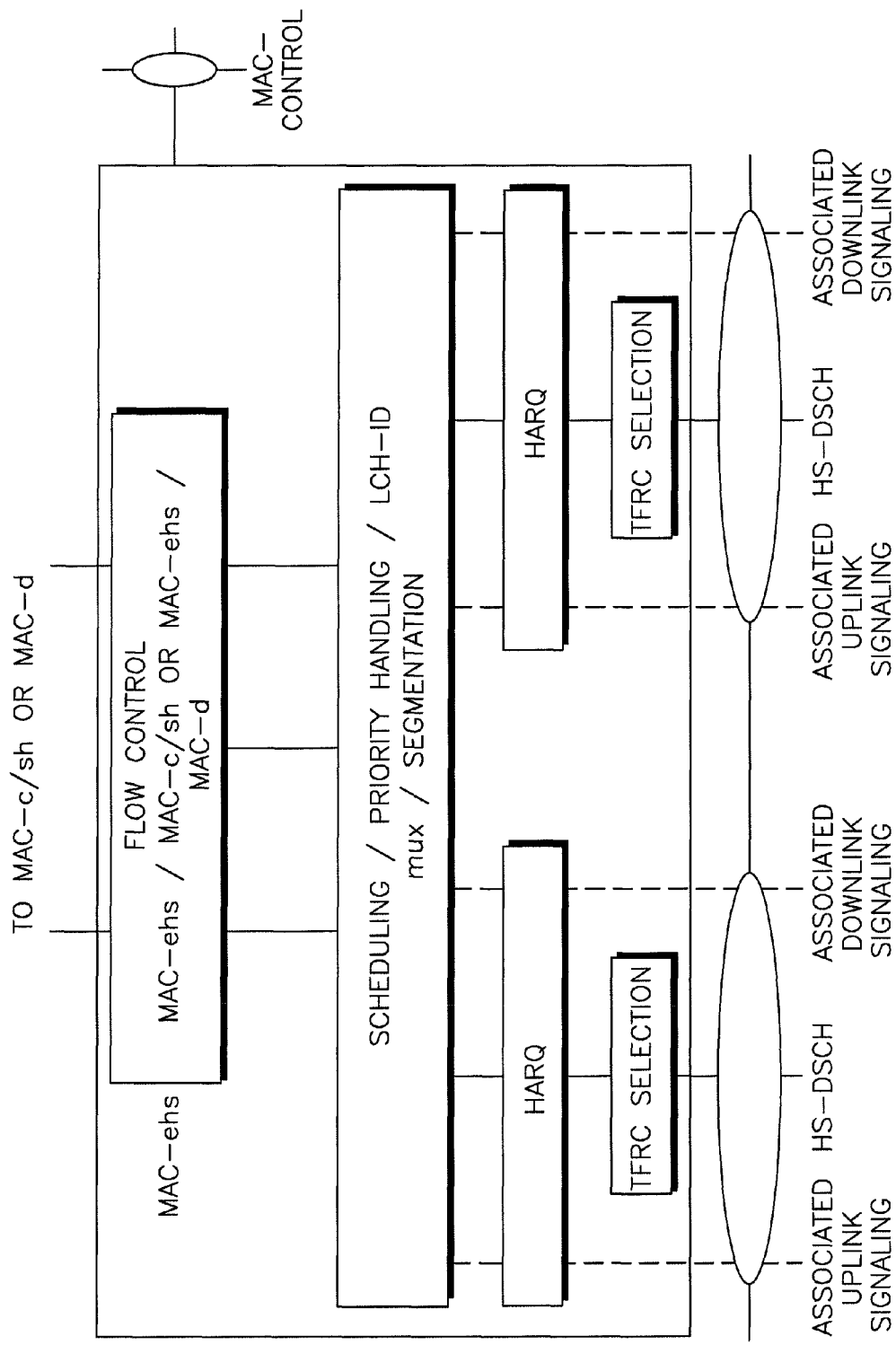
FIG. 2 is a diagram of an example of a UTRAN side MAC-ehs architecture for DC-HSDPA with separate HARQ entities.
Figure 3:
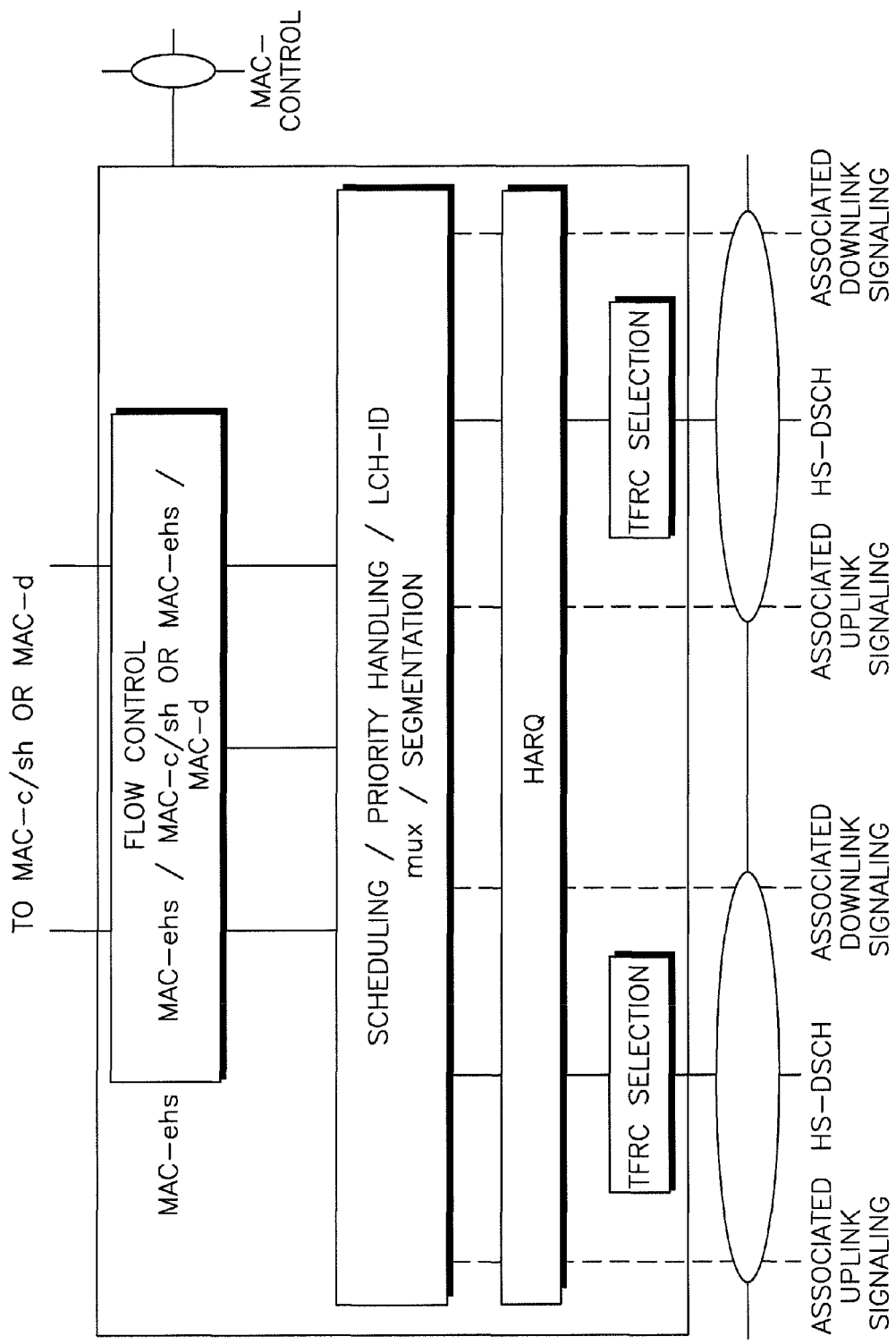
FIG. 3 is a diagram of an example of a UTRAN side MAC-ehs architecture for DC-HSDPA with a joint HARQ entity.
Figure 4:
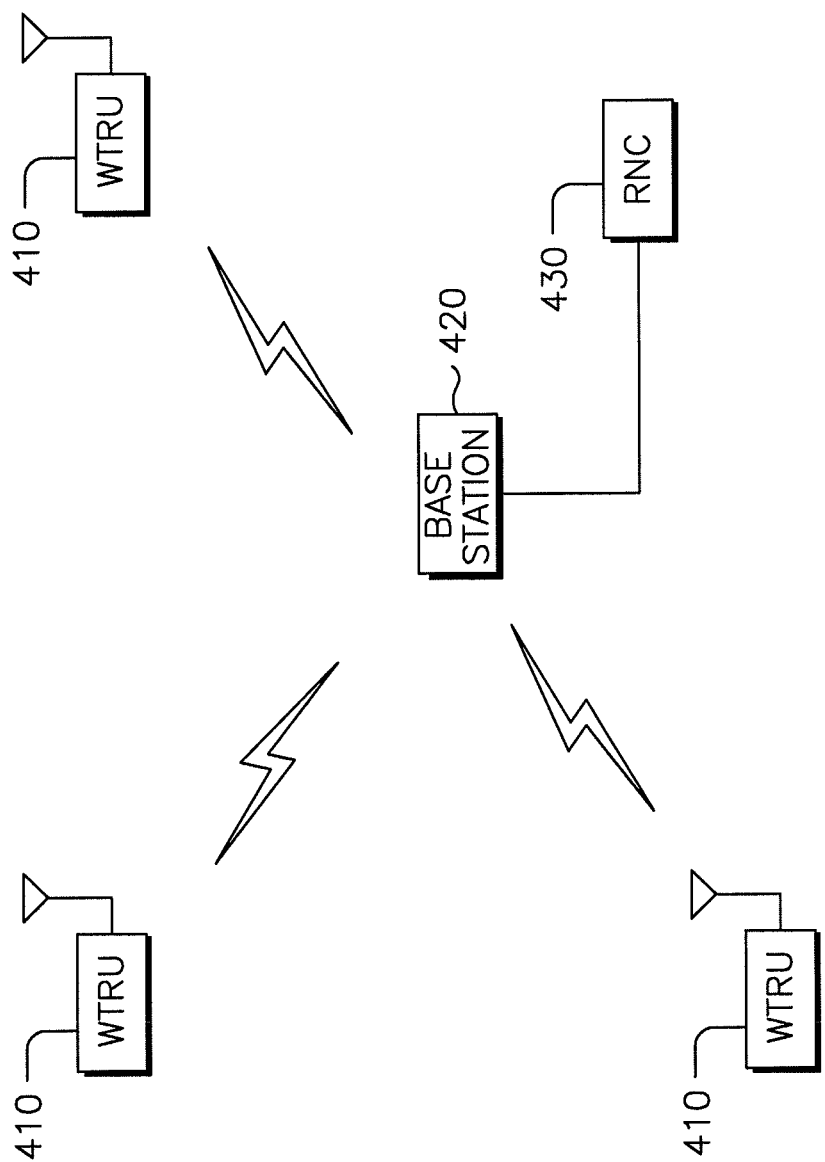
FIG. 4 is a diagram of an example wireless communication system including a plurality of wireless transmit/receive units (WTRUs), a base station, and a radio network controller (RNC)

FIG. 4 shows a wireless communication system 400 including a plurality of WTRUs 410, a base station 420, and a radio network controller (RNC) 430 that may control multiple base stations. As shown in FIG. 4, the WTRUs 410 are in communication with the base station 420, which is in communication with the RNC 430.

Although three WTRUs 410, one base station 420, and one RNC 430 are shown in FIG. 4, any combination of wireless and wired devices may be included in the wireless communication system 400. Although the RNC 430 is shown in the wireless communication system 400, the RNC 430 may not be included in some wireless systems such as LTE, where the base station 420 may be configured as an Evolved UTRAN Node-B (eNB).

Figure 5:
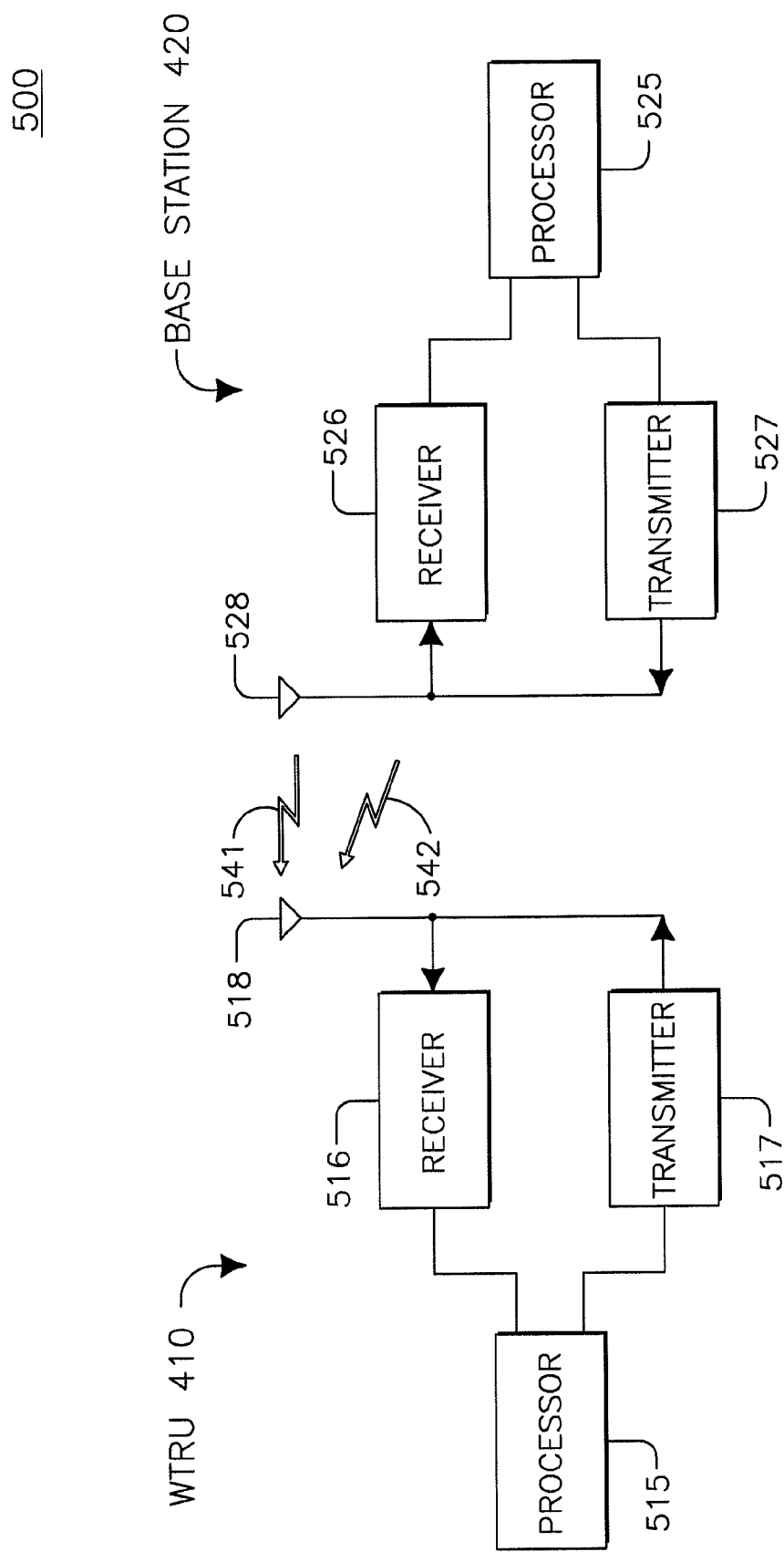
FIG. 5 is a functional block diagram of a WTRU and the base station of FIG. 4.

FIG. 5 is a functional block diagram 500 of a WTRU 410 and the base station 420 of the wireless communication system 400 of FIG. 4. As shown in FIG. 5, the WTRU 410 is in communication with the base station 420 and both may be configured to perform the methods of data reception in a wireless communication network disclosed below.

In addition to the components that may be found in a typical WTRU, such as a display (not shown), the example WTRU 410 includes a processor 515, a receiver 516, a transmitter 517, and an antenna 518. The processor 515 is configured to facilitate the implementation of the methods of improving data reception disclosed below. The receiver 516 and the transmitter 517 are in communication with the processor 515. The antenna 518 is in communication with both the receiver 516 and the transmitter 517 to facilitate the transmission and reception of wireless data.

In addition to the components that may be found in a typical base station, such as a display (not shown), the base station 420 includes a processor 525, a receiver 526, a transmitter 527, and an antenna 528. The processor 525 is configured to facilitate the implementation of the methods of improving data reception disclosed below. The receiver 526 and the transmitter 527 are in communication with the processor 525. The antenna 528 is in communication with both the receiver 526 and the transmitter 527 to facilitate the transmission and reception of wireless data.

The WTRU configuration is typically set up to complement the type of signaling that is received from the base station. For example, the WTRU configuration may be implemented by the WTRU receiving a configuration message from the base station which message may originate with the RNC. Accordingly, a WTRU can be configurable into a variety of configurations so the WTRU can operate to receive the two carriers 541, 542 for different BS transmission environments.

In an example of a first BS transmission environment, the BS 420 is configured to transmit identical data on a first anchor carrier 541 and on a second supplementary carrier 542 to thereby exploit frequency diversity. Once the identical data is received by the WTRU it may then be processed in various manners.

In a first example configuration for implementing such processing, the WTRU's receiver 516 receives the two carriers 541, 542 via antenna 518 that carry the same information. The processor 515 in conjunction with the receiver 516 then combine the two carriers 541, 542 at baseband and decode the combined signal. The processor 515 decodes the added signal as if only one signal has been received at the WTRU. This example requires minimal complexity because the WTRU is only required to add two baseband signals, and a single receiver chain may be used to recover the received data.

In a second example configuration for implementing such processing, the WTRU may be configured to combine the two carriers 541, 542 that carry the same information based on the signal strength of each carrier. The WTRU can be configured to assign a higher weight to the carrier with the higher signal-to-noise ratio (SNR). After the WTRU assigns a weight to each carrier 541, 542, the WTRU combines the two carriers at baseband into a single receiver chain. The WTRU then decodes the combined signal. The SNR can be based, for example, on measurements from a common pilot channel (CPICH) or a high-speed shared control channel (HS-SCCH).

In a third example configuration for implementing such processing, the WTRU can be configured to demodulate each of the received carriers 541, 542 and then to combine the two carriers at a soft bit level. After the carriers 541, 542 are combined, the WTRU then decodes the combined signal. In this example, two demodulator chains and soft-bit combining are required before the WTRU decodes the combined signal.

In a fourth example configuration for implementing such processing, the WTRU can be configured to use two full receiver chains rather than a single receiver chain. In this option, the WTRU processes each carrier separately and then selects the carrier data that passes a cyclic redundancy check (CRC). This example configuration adds a full second chain and does not provide any combining gain. Moreover, this example configuration is more complex because it adds more hardware to process a second full receiver chain.

According to another BS transmission environment, the BS 420 is configured to able to transmit different coded data from the same data block. Accordingly, the coded data on the first carrier 541 may be different from the coded data on the second carrier 542. In this environment, once the different coded data is received by the WTRU 410, the WTRU 410 is configured to process each carrier 541, 542 separately and the WTRU 410 can be configured to select carrier data that passes a CRC. The BS 420 may code the data in each carrier 541,542 a variety of ways.

The coding for each carrier 541, 542 can be based on channel characteristics or the coding for each carrier can be pre-defined. Further, the modulation and coding in the first carrier 541 and the second carrier 542 may be optimized for different fading channels to ensure that at least one of the carriers 541, 542 is likely to always perform well.

Alternatively, the BS 420 may code the user data differently for each carrier 541, 542, but in such a manner that the WTRU 410 may combine a plurality of coded data packets at the soft symbol or the soft bit level before attempting to decode the packets. The BS 420, accordingly, may use different redundancy versions (RVs) and/or different code rates and different radio resources for retransmissions. Effectively, the BS 420 sends two transmissions, which would otherwise be a "first transmission" and a "second transmission" of the same hybrid automatic repeat-request (HARQ) process, simultaneously rather than sequentially. Additionally, different code rates, modulation types, and powers may be used on different carriers for additional link adaptation or scheduler flexibility.

In addition, the BS 420 may operate without the HS-SCCH when the two transmissions are sent simultaneously across the two carriers 541, 542. In this case, the WTRU 410 can be configured to simultaneously monitor pairs of high speed physical downlink shared channels (HS-PDSCH) (one or two HS-PDSCH per carrier). The first transmission, over the two carriers 51, 542, is sent without any associated HS-SCCH(s), whereas the retransmission is performed with the associated HS-SCCH(s). The RV of the HS-PDSCH transmitted over the anchor and supplementary carriers may be pre-defined or alternatively, configured by the network for all transmissions.

At each transmission time interval (TTI) when transmission to the WTRU is possible, the WTRU 410 can be configured to attempt to decode from a set of configured HS-PDSCH codes, a potential data block transmitted over the two HSDPA carriers. Where a discontinuous reception (DRX) configuration is used by the WTRU, DRX parameters will typically control when transmission to the WTRU is possible.

For such decoding, the WTRU 410 can be configured to de-spread the received signals after demodulation according to the specific HS-PDSCH channelization codes of interest and to store the resulting symbols from both the anchor and supplementary carriers in an incremental redundancy buffer according to the pre-configured or configured RV associated with each carrier. The WTRU 410 is configured to then attempt to decode the buffer contents. If a CRC is successful, then the data is passed on to higher layers. Otherwise, the WTRU 410 attempts to decode from a new set of channelization codes. Once all of the configured HS-PDSCH codes are exhausted, the procedure is completed for the current TTI. At a next TTI, the same operations can be performed again. This allows a reduction of latencies associated with HARQ round-trip time (RTT) for real-time service applications such as Voice over Internet Protocol (VoIP).

Alternatively, the BS 420 may avoid the transmission of the HS-SCCH over two carriers 541, 542, where re-transmission, after the initial simultaneous transmission of the two RVs over the two carriers 541, 542, is not possible. In such BS transmission environment, the WTRU 410 can be configured to not monitor the HS-SCCH, and to not transmit an acknowledged/not acknowledged (ACK/NACK) indication (feedback) because the BS will not retransmit. However, the WTRU 410 may benefit from diversity between the two RVs. The WTRU 410 can be configured to attempt to decode the HS-PDSCH channels of both carriers 541, 542 during the TTIs where it is possible that data is transmitted for the WTRU 410 consistent with DRX parameters, if configured.

In another alternative, the BS may reduce transmission of the HS-SCCH, by being configured to transmit the RVs simultaneously over both carriers 541, 542 during retransmission. The initial transmission, which is without the HS-SCCH, is performed on either the anchor carrier 541 or the supplemental carrier 542.

The following describes the case where both carriers 541, 542 transmit the same medium access control (MAC) level data, but using different modulation, RV and/or code rate. In this case, the BS 420 transmits the scheduling information of both carriers over one HS-SCCH on the anchor carrier, or alternatively, on the supplementary carrier. Additionally, a new type of HS-SCCH may be defined that is used when the network sends the same user data over both carriers 541, 542.

In one option, both carriers 541, 542 use the same modulation and same channelization codes on both resources; however, the RV used for the physical data over both carriers 541, 542 is different. A pre-defined mapping may be used in the network and the WTRU 410 between the RV used in the anchor and supplementary carriers. This allows the BS 420 to signal the scheduling of both carriers 541, 542 over one HS-SCCH and use only one field for the RV and HARQ process. Upon the reception of the HS-SCCH, the WTRU 410 uses the signaled RV to decode the data on the anchor carrier. In such case, the WTRU 410 can be configured to use the pre-defined mapping to generate or find an index to the RV of the supplementary carrier. For example, the following formula can be used to determine the index to the three bit index to the RV coding for the supplementary carrier:

$$X_{rv}\text{sup} = (X_{rv} + n) \bmod 8 \quad \text{Equation (1)}$$

where Xrv is a three bit index signaled over the HS-SCCH to the WTRU 410, indicating the index to the RV coding for the anchor carrier, and n is a parameter that is configured by the network or by the WTRU 410 and n may have a value of 0 or any positive integer.

Additionally, the modulation used can be different for both carriers 541, 542, wherein the BS 420 may use two fields in the HS-SCCH, which is transmitted over the anchor or the supplementary carrier, to indicate the modulation and only one field is used for the RV.

Figure 6:
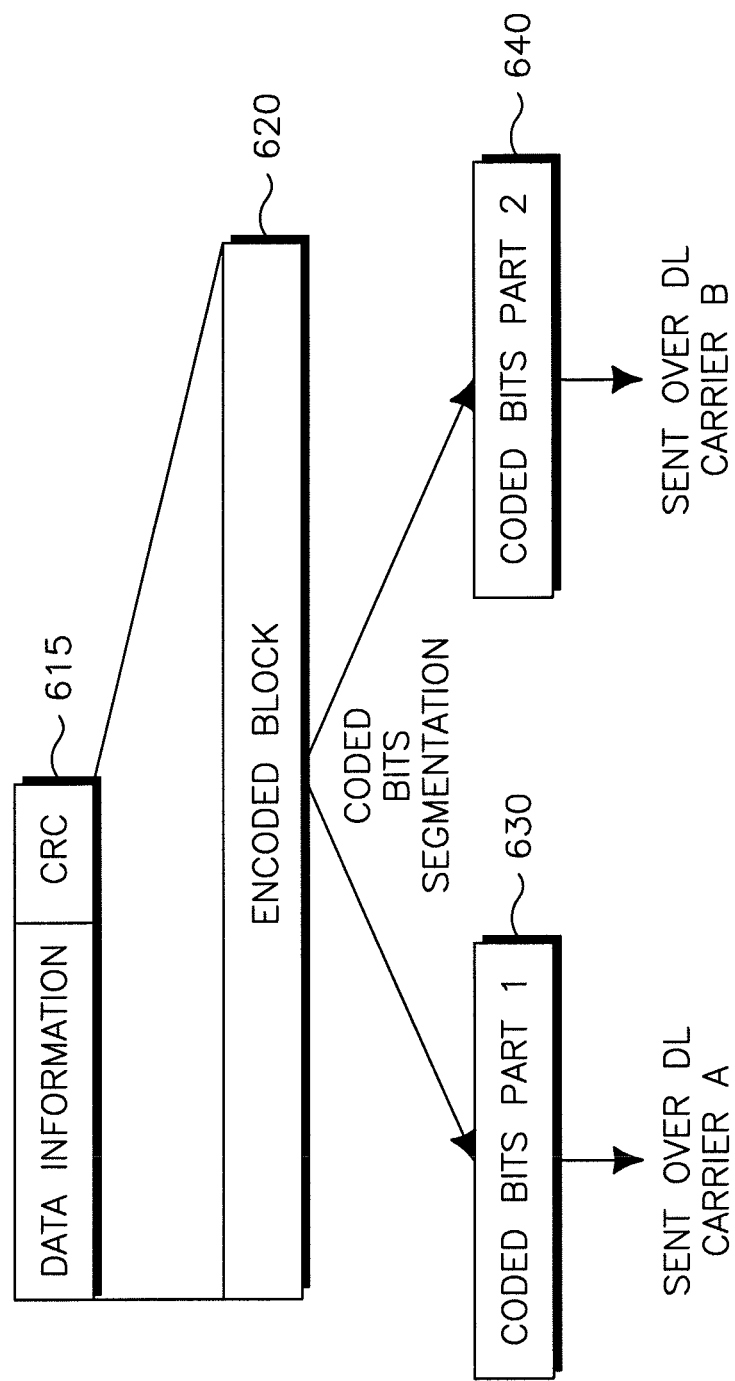
FIG. 6 is a diagram of an example of joint coding of data across two carrier channels.

In another BS transmission environment, the BS 420 is configured to use joint coding of the data across the two carrier channels. Referring to FIG. 6, the BS 420 encodes the data into a single coded block 620, which may be performed with code block segmentation. Then the BS 420 divides the coded block 620 into two coded segments. The coded block 620 may be processed as a single block using only one CRC 615 (as shown) for the entire block, or alternatively there may be one CRC per code segment (i.e., one CRC per carrier), or one CRC per code block segment. One coded segment 630 will be sent over a first carrier and a second coded segment 640 will be transmitted over a second carrier. The coded segments (630 and 640) are sent over their respective DL carriers to a WTRU 410. The WTRU 410 receives and demodulates and jointly decodes the signals. The basic coding methods implemented in the 3GPP standard are applicable, while other variations may be applicable as well. For example, a lower rate turbo code may be used as the basic code prior to puncturing. A low-density parity-check (LDPC) code may also be applied. The coded data is segmented between the first carrier 541 and the second carrier 542 without any fundamental impact on the interleaving and rate matching functions in each carrier. Different effective per-carrier code rates may be used on the different carriers 541, 542, for example, the code rate for the part of the coded segment transmitted on the first carrier 541 may be different than the rate on the second carrier 542. In addition, different modulation types and powers may also be used on the different carriers 541, 542 for dynamic link adaptation, capacity, or scheduler flexibility. Alternatively, space-time block coding based transmit diversity (STTD) codes may be used for transmit diversity in two antennas. Similarly, STTD processing may be used at the WTRU.

In another BS transmission environment, the BS 420 is configured to use intelligent scheduling and retransmission of data. The BS 420 is configured to compare performance, e.g. performance measurements and/or performance statistics, between the two carriers based on a channel quality indicator (CQI) feedback or CQI report for previously transmitted timeslots. The carrier with better performance may be biased for higher load to maximize data throughput. Adaptive Modulation and Coding (AMC) may be used in conjunction to produce maximum capacity and utilization. Further, for a group of WTRUs, each may be assigned to use the different dual carriers to provide improved load balancing, either semi-statically or dynamically, based on WTRU/carrier channel qualities.

Figure 7:
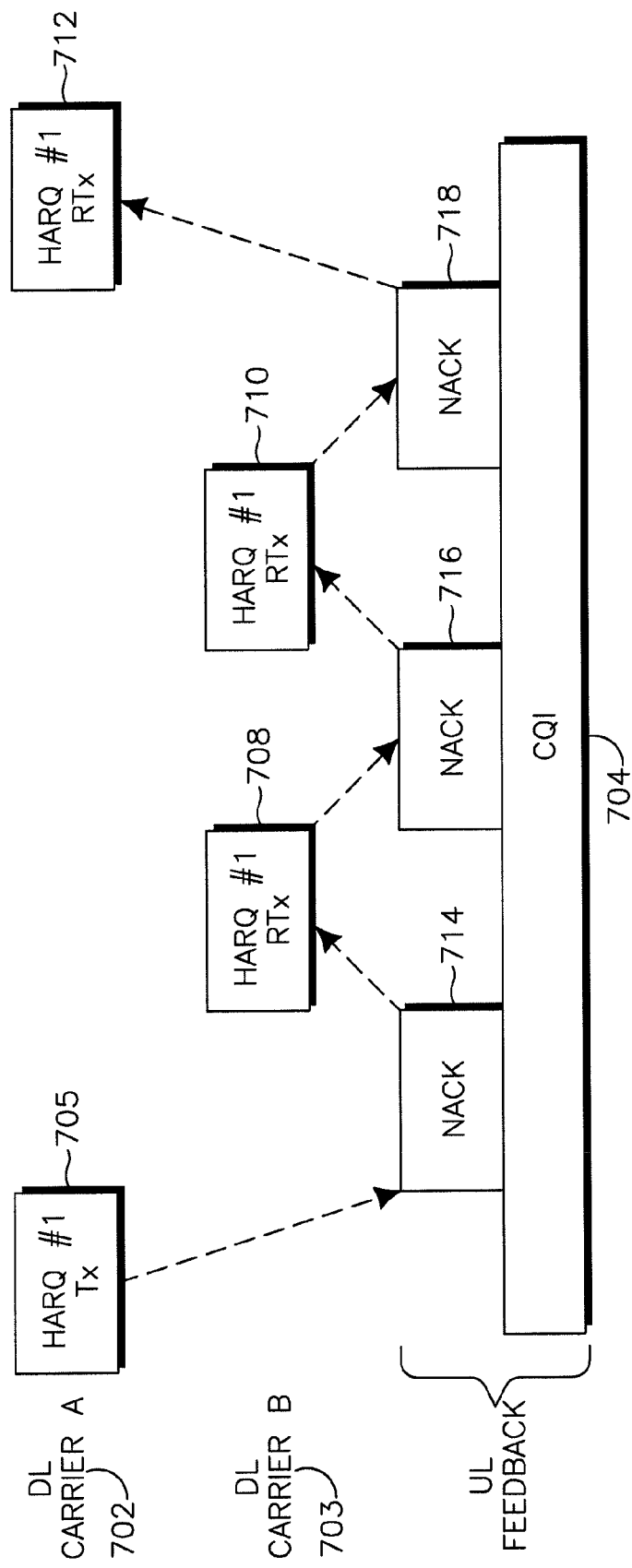
FIG. 7 is a diagram of an example of an embodiment using non-simultaneous carrier-independent HARQ process transmissions/retransmissions.

FIG. 7 shows an example of a BS transmission in an environment using non-simultaneous carrier-independent HARQ process transmissions/retransmissions. In this example, a single transport block, such as a MAC layer protocol data unit (PDU) containing user data, is transmitted by a single HARQ process. The HARQ transmissions/retransmissions are independent from the DL carriers 541, 542.

The BS 420 may transmit a first downlink HARQ transmission on a first carrier and may transmit one or more HARQ retransmissions on a different carrier. In the example of FIG. 7, the BS 420, using a HARQ process 1 (HARQ #1), transmits a HARQ #1 transmission (Tx) 705 on DL Carrier A 702. The BS receives a NACK 714 over the UL from the WTRU that, accordingly, requires a retransmission. The HARQ #1 process sends HARQ #1 retransmission (RTx) 708 on Carrier B 703. Another NACK 716 is generated by the WTRU and received by the BS that, accordingly, requires another retransmission. The BS using HARQ #1 process again retransmits by sending HARQ #1 retransmission 710 on Carrier B 403. A further NACK 718 is generated by the WTRU and received by the BS that, accordingly, requires a further retransmission. The BS using HARQ #1 process then sends a further HARQ #1 retransmission 712 on Carrier A 702.

In addition to generating NACKs, the WTRU may also generate and send on the UL to the BS CQI reports. The decision to switch carriers for the retransmissions as illustrated in the example of FIG. 7 may be made based on a CQI report 704. For example, channel quality may be compared to a channel quality threshold value and/or traffic may be compared to a traffic load threshold value. This provides more flexibility to the BS, such that the BS can attempt to optimize the scheduling of user transmissions and retransmissions based on channel quality and/or traffic load that is reported on each carrier.

Figure 8:
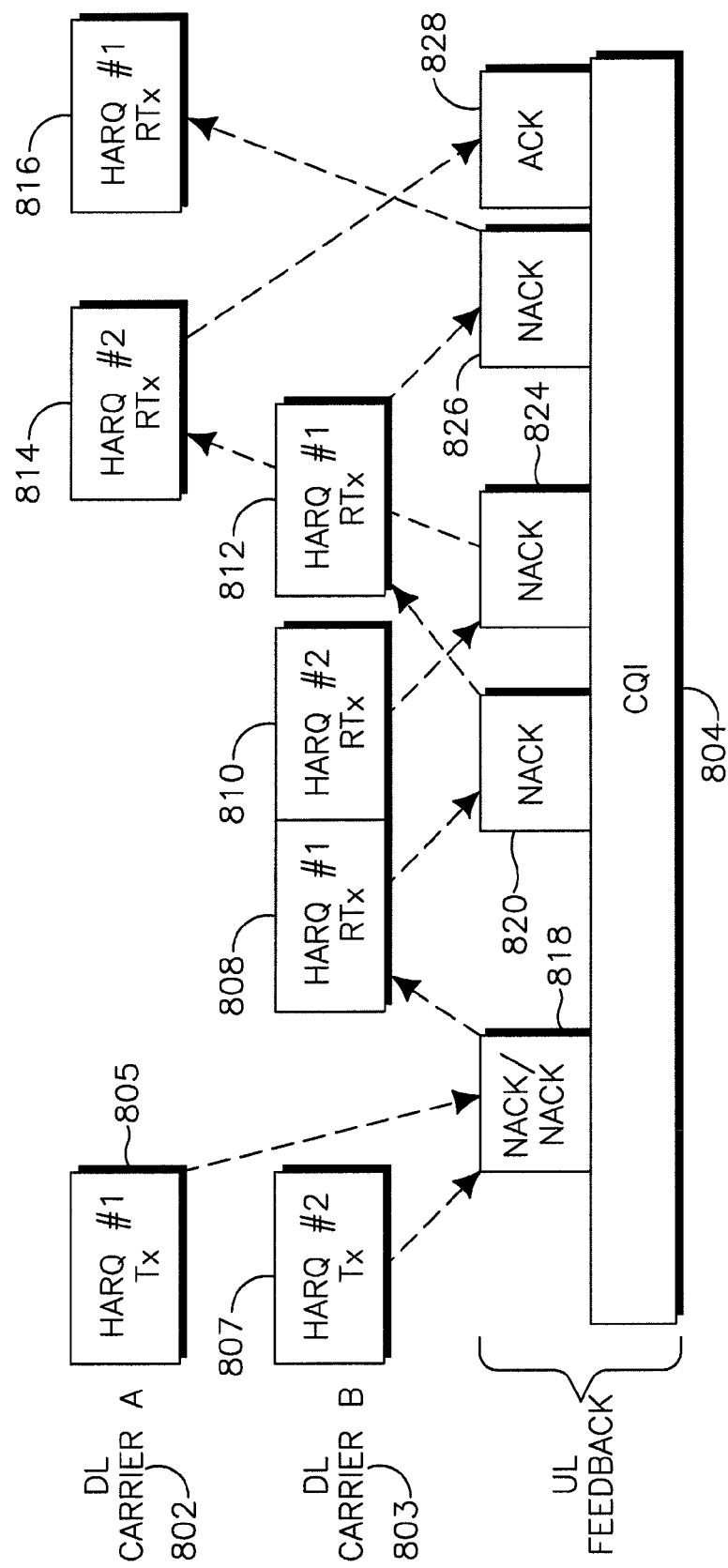
FIG. 8 is a diagram of an alternate example of an embodiment using possibly simultaneous carrier-independent HARQ process transmissions/retransmissions.

FIG. 8 shows an example of a BS transmission in environment that provides for the possible use of simultaneous carrier-independent HARQ process transmissions/retransmissions. In this example, two MAC PDUs are transmitted by the BS using two HARQ processes. HARQ process #1 and HARQ process #2 concurrently commence transmissions 805 and 807, respectively, on Carrier A 802 and Carrier B 803. For both HARQ processes, the WTRU generates NACKs 818 requiring both processes to retransmit. A first retransmission for each HARQ process, HARQ #1 retransmission 808 and HARQ #2 retransmission 810, is transmitted on Carrier B 803. In the example, these retransmissions fail so that respective NACK 820 and NACK 824 are generated by the WTRU which is also generating and reporting CQI reports 804 to the BS on the UL.

The BS may decide to change the carrier for the HARQ process retransmission if the CQI reported for one carrier is significantly better than the CQI report for the other carrier, e.g. channel quality may be compared to a channel quality threshold value and/or traffic may be compared to a traffic load threshold value. In the example of FIG. 8, after the failure of both first retransmissions, a BS decision is reflected whereby HARQ #1 continues to retransmit 812 on Carrier B 803 and HARQ #2 retransmits on Carrier A 802. The example reflects that the second HARQ #2 retransmission succeeds, indicated by the WTRU generating an ACK 828. The second HARQ #1 retransmission 812 fails as indicated by NACK 826. The BS makes a decision to change carriers for HARQ #1 process based upon a CQI report 804 and send further HARQ #1 retransmission 816 on Carrier A 802.

In order to allow the carrier-independent HARQ processes, the scope of the HARQ process number that is sent to the WTRU should be valid across both carriers. Carrier-independent HARQ processes and joint HARQ processes between carriers may be used interchangeably. Joint HARQ processes between N carriers and carrier-independent HARQ processes refer to a set of HARQ processes for which transmissions and retransmissions may be carried over any of the N carriers. A joint HARQ process can be defined as one HARQ process belonging to a set of joint HARQ processes.

The following approaches for addressing HARQ processes utilizing carrier-independent HARQ retransmission have little or no impact to L1 signaling. These approaches do not require any L1 protocol re-design. A WTRU is preferably configured to determine the identity of a joint HARQ process from such addressing. The WTRU then may use that determined identity to process the data transmissions and retransmissions of the identified HARQ process.

Four bits are needed to independently address, i.e. identify, 16 HARQ processes. For one embodiment, three existing HARQ process information bits, $X_{hap,1}$, $X_{hap,2}$, $X_{hap,3}$ that are carried on the HS-SCCH type 1 to indicate a first part of a HARQ process identity are used in combination with additional information. The additional information may include a HS-DSCH radio network temporary identifier (H-RNTI), timing information, a new data (ND) indicator bit (NDI), or the channelization code of the HS-SCCH to provide the necessary 4th bit for the second part of the HARQ process identity denoted by $X_{hap,4}$. Thus, the full 16 HARQ processes can be addressed, i.e. identified, by using $X_{hap,1}$ through $X_{hap,4}$. Thus, the combination of $X_{hap,1}$ through $X_{hap,4}$, i.e. the first part of the HARQ process identity combined with the second part of the HARQ process identity, yields the full HARQ process identity. $X_{hap,4}$ may be an information field or element of one or more bits depending on the number of HARQ processes that are jointly used.

$X_{hap,4}$ is not constrained to be in any specific position with respect to the other bits, $X_{hap,1}$, $X_{hap,2}$, $X_{hap,3}$, addressing the HARQ processes, e.g. $X_{hap,4}$ is not necessarily the least significant bit or the most significant bit. Where multiple HARQ entities exist, e.g. two HARQ entities, $X_{hap,4}$ can be interpreted as indicating to which HARQ entity the HARQ process under consideration belongs. In other words, $X_{hap,4}$ can be considered as an "additional information," that may be used to uniquely identify or address a subset or group of HARQ processes, which are then further addressed by the 3 existing HARQ process information bits carried on the HS-SCCH. For instance, in the case where 16 HARQ processes are jointly used between two carriers, the additional information or $X_{hap,4}$ may indicate whether the transmission belongs to a first set of 8 HARQ processes or a second set of 8 HARQ processes. Once the group is determined by this additional information, $X_{hap,1}$, $X_{hap,2}$, and $X_{hap,3}$ can be used to determine the HARQ processes within the group.

In one example, a second or a plurality of H-RNTI may be provided to the WTRU by the network using radio resource control (RRC) signaling, for example, via a configuration message. The WTRU can then be configured to monitor for all such provided H-RNTIs simultaneously. The WTRU can accordingly be configured to decode an associated HS-PDSCH and identify a HARQ process when the WTRU receives an HS-SCCH carrying one of the assigned H-RNTIs. The HARQ process identity can then be derived for example by setting $X_{hap,4}$ to "0" (or alternatively "1") if the primary H-RNTI is used and "1" (or alternatively "0") if the secondary H-RNTI is used. If multiple H-RNTIs are used, the value of $X_{hap,4}$ or the group which the H-RNTIs are addressing can be explicitly signaled by the RRC or alternatively it can be implicitly determined based on the order of the configured H-RNTIs. The first H-RNTI may correspond the first group, the second to the second group, etc.

This example allows the reuse of existing coding formats of the HS-SCCH. This may be problematic when many WTRUs are present in a cell, since the number of usable H-RNTI is typically limited.

Where the supplementary carrier is deactivated, the WTRU may be configured to continue to monitor all provided H-RNTIs and make use of all 16 HARQ processes. Alternatively, the WTRU may be configured to stop monitoring the secondary H-RNTI or the primary H-RNTI. In the latter case, upon deactivation of the carrier, the WTRU may be configured to flush the buffer of the HARQ processes and only use one HARQ entity.

In another embodiment, the WTRU may be configured, for example, by receiving a configuration message from the network, to facilitate processing of joint HARQ processes or independent HARQ processes, i.e., HARQ processes associated with a specific carrier. More specifically, a second H-RNTI may be used as an optional parameter that, if present, implies that the 16 HARQ processes can be used by any of the two carriers. Otherwise, if only one H-RNTI is provided to the WTRU, the absence of the second H-RNTI may be used to imply that each HARQ entity is associated with a specific carrier.

In such embodiment, the WTRU may be configured to re-interpret one bit in the existing HS-SCCH to signal the value of $X_{hap,4}$. For example, the NDI bit ($X_{nd,1}$) may be re-interpreted when DC-HSDPA operations are enabled to indicate the value of $X_{hap,4}$. The NDI bit can act as the additional information that signals whether the HARQ process belongs to the first group or the second group.

This embodiment has the advantage of allowing the reuse of existing coding formats of the HS-SCCH, since it makes use of the same total number of information bits as these formats, but may restrict the scheduler. If the WTRU is configured to re-interpret $X_{nd,1}$, this implies that the scheduler is limited to using incremental redundancy in DC-HSDPA, as opposed to being able to also use chase combining. However, this particular limitation is not extremely important since such limitation is also imposed for multiple input multiple output (MIMO) mode operations.

In this embodiment, the timing of the HS-SCCH transmission, or equivalently, the timing of the associated HS-PDSCH transmission may be used to indicate the value of $X_{hap,4}$. The timing is best defined at the subframe level (2 ms). For example, "even" values of HS-SCCH subframe numbers may correspond to $X_{hap,4}=0$, while "odd" values of HS-SCCH subframe numbers may correspond to $X_{hap,4}=1$, or vice versa. Since there is an odd number of HS-SCCH subframes within a frame and since the subframe numbers cycle every frame, this approach results in $X_{hap,4}$ values corresponding to the even HS-SCCH subframes that are used more often than $X_{hap,4}$ values corresponding to the odd HS-SCCH subframes. Thus, the NodeB scheduler will provide more opportunities to use certain subsets of HARQ processes over other subsets of HARQ processes.

To avoid the limitation of having more opportunities to signal certain HARQ processes more than others, the value of $X_{hap,4}$ may additionally be based on a frame counter. For example, in addition to the HS-SCCH subframe number, the connection frame number (CFN) may be used such that, for example, over two frames, the number of times $X_{hap,4}=0$ is the same as $X_{hap,4}=1$. One way to achieve this is by using the following formulation for setting the value of $X_{hap,4}$:

$$X_{hap,4}=(5\times CFN\_HSSCCH+S\_HSSCCH) \bmod 2, \quad \text{Equation (2)}$$

where CFN_HSSCCH and S_HSSCCH are respectively the connection frame number and the subframe number of the HS-SCCH transmission. Different timers and counters may be used to achieve similar results.

With this approach, each HARQ process is available for transmission in a given carrier every other subframe, and a transmission from a HARQ process is possible every subframe on one of the two carriers. Thus, the NodeB scheduler benefits from the possibility of transmitting or re-transmitting on the best carrier within a window of two sub-frames thereby providing carrier-diversity. Since in many scenarios the channel correlation between two successive sub-frames is higher than between the two carriers, this approach yields better performance than using separate HARQ entities. However, there is a cost of a possible additional transmission delay of one sub-frame.

One potential issue with the timing-based HARQ process indication is the scenario where one of the carriers, for example the supplementary carrier, is being de-activated. The BS and WTRUs can be configured to implement one or more of several options to handle this situation.

In an example of a first option, upon de-activation of the supplementary carrier or after a pre-defined duration after the de-activation, half of the HARQ processes are de-activated and the corresponding HARQ entities are flushed. The remaining HARQ processes are available to every sub-frame in the remaining anchor carrier. This approach may result in loss of data unless the HARQ processes are prevented from being disabled for a certain period prior to de-activation.

In an example of a second option, all 16 HARQ processes are maintained when the supplementary carrier is disabled and the timing-based HARQ process indication is maintained. This means that a given HARQ process is available every other subframe in the remaining anchor carrier. This approach has the advantage of avoiding any loss of data upon de-activation while still allowing the WTRU to transmit continuously. A small drawback is that the timing of the retransmissions for a certain HARQ process cannot be chosen within an interval of two sub-frames.

In an example of another embodiment, a WTRU is configured to use the channelization code to determine the value of the $X_{hap,4}$. More specifically, the WTRU may be configured, for example by receiving a configuration message, with two sets of channelization codes in each carrier which can be used to determine $X_{hap,4}$. For instance, the one set of channelization codes may signal "0" and the other set channelization codes may signal "1".

Alternatively, the network may signal the HS-SCCH channelization code set, and the WTRU and network are pre-configured to use the first half HS-SCCH codes of the signaled set from the RRC to signal "0" and the second half of the set to signal "1". Alternatively, the codes are numbered from 0 to 3 in the order of the signaled set in the RRC message then the WTRU and network can be pre-configured to use the odd numbered codes to signal "0" and the even numbered codes to signal "1" or vice versa.

Figure 9:
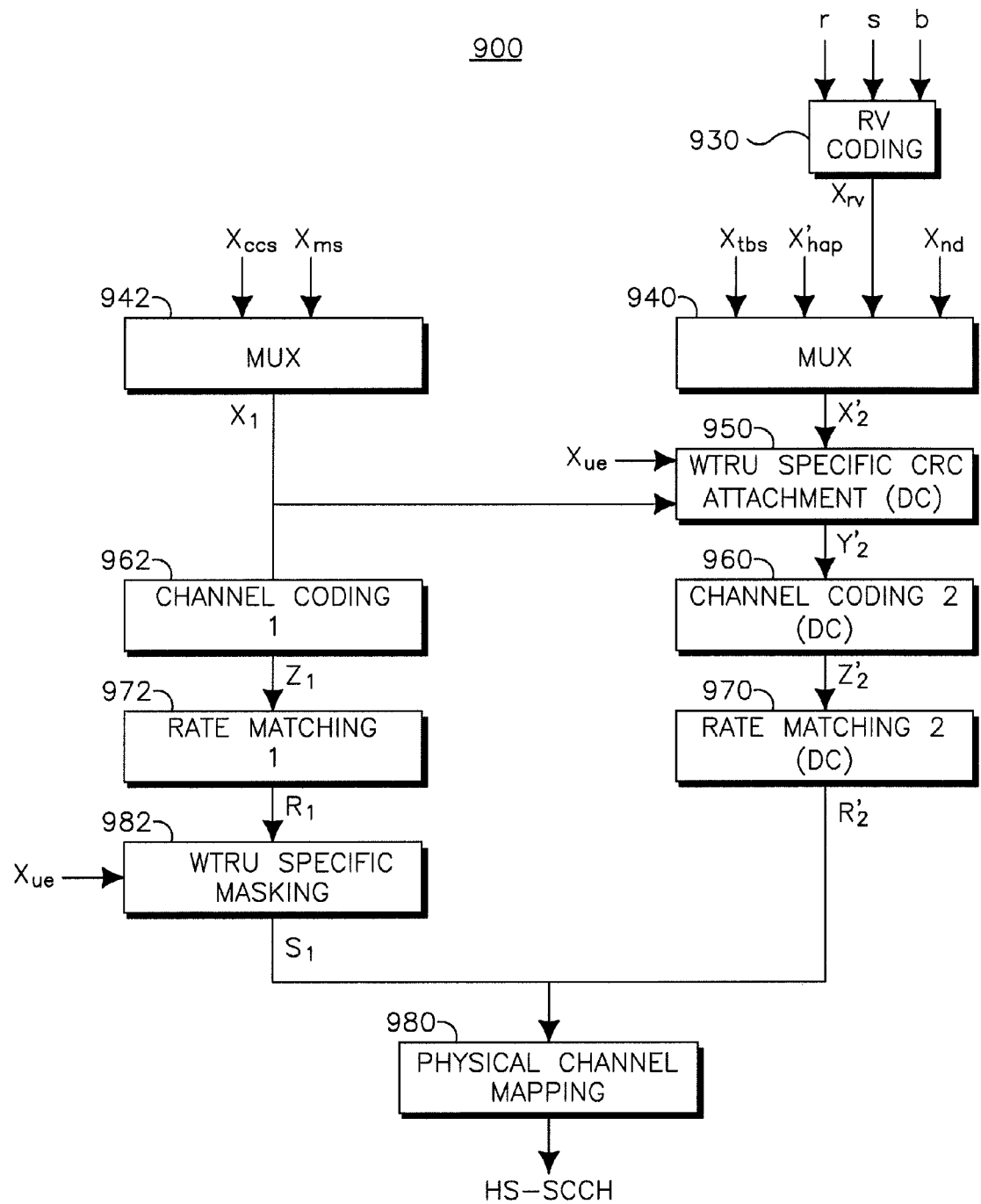
FIG. 9 is a diagram of an example of encoding using a new HS-SCCH type DC to support full signaling of 16 HARQ processes.

In such an embodiment, a new HS-SCCH type may be introduced to support full signaling of the 16 HARQ processes. When DC-HSDPA is enabled, the network may use this new HS-SCCH type, "HS-SCCH type DC." HS-SCCH type DC may contain an additional bit, over and above the conventional HS-SCCH type, that enables the signaling of 16 HARQ processes. This may be accomplished, for example, by deriving the HS-SCCH type DC from the HS-SCCH type 1, with an additional bit in the HARQ process information field. Thus, the new HS-SCCH type DC may carry the following information, where changes with respect to HS-SCCH type 1 are underlined:

Channelization-code-set information (7 bits): $x_{ccs,1}$, $x_{ccs,2}$, ..., $x_{ccs,7}$ Modulation scheme information (1 bit): $x_{ms,1}$ Transport-block size information (6 bits): $x_{tbs,1}$, $x_{tbs,2}$, ..., $x_{tbs,6}$ Hybrid-ARQ process information (4 bits): $x_{hap,1}$, $x_{hap,2}$, $x_{hap,3}$, $x_{hap,4}$ Redundancy and constellation version (3 bits): $x_{rv,1}$, $x_{rv,2}$, $x_{rv,3}$ New data indicator (1 bit): $x_{nd,1}$ WTRU identity (16 bits): $x_{ue,1}$, $x_{ue,2}$, ..., $x_{ue,16}$ As shown in FIG. 9, the encoding for the new HS-SCCH type DC may also follow the existing encoding for HS-SCCH type 1, with the distinction that an additional HARQ process information bit or bit field is present. That is, all the elements have their conventional meaning, except for those directly affected by the addition of a bit field for $X'_{hap}$. $X'_2$ is altered since it is generated by multiplexor 940 using $X'_{hap}, X_{tbs}$, and $X_{nd}$. The WRTU specific CRC attachment processing block 950, channel coding processing block 960, and rate matching 2 processing block 970 are modified to accommodate the additional information and the dimensions of $Y'_2$, and $Z'_2$ are accordingly altered.

$X'_{hap}$, in this example, may consist of the 4 bits $X_{hap,1}$, $X_{hap,2}, X_{hap,3}, X_{hap,4}$. As a consequence, $X'_2$ has an additional bit and may consists of a sequence of bits $x'_{2,1}, x'_{2,2}, \ldots, x_{2,13}$ where $x'_{2,i} = x_{tbs,i}$ i=1,2, . . . , 6
$x'_{2,i} = x_{hap,i-6}$ i=7, 8, 9, 10
$x'_{2,i} = x_{rv,i-9}$ i=12, 13, 14
$x'_{2,i} = x_{nd,i-12}$ i=14

The WRTU specific CRC attachment 950 can be calculated using the sequences $X_1$ and $X'_2$ in the same way it is calculated for the HS-SCCH type 1 using $X_1$ and $X_2$, and the WTRU-specific identity $X_{ue}$, specifically, the 16-bits H-RNTI. This leads to $Y'_2$ with one additional bit, and $Z'_2$ with 3 additional bits.

To compensate for the additional bits, the "Rate matching 1" procedure 972 from the HS-SCCH type 1, is modified. In particular, the sequence of bits $Y'_2$ for HS-SCCH type DC carries 30 bits, as opposed to 29 bits for Y in HS-SCCH type 1. This results in modifying the "Rate matching 2" procedure 970, from the conventional puncturing of 31 bits for HS-SCCH type 1, to the puncturing of 34 bits, i.e. the puncturing of 3 extra bits. The resulting change in coding rate is almost insignificant: 0.3750 for HS-SCCH type DC versus 0.3625 for HS-SCCH type 1. The small difference can be compensated for by using slightly more power to transmit the HS-SCCH DC, if necessary.

The resulting sequence R'2, which corresponds to the second part of the HS-SCCH is finally physical channel mapped with the first part of the HS-SCCH, namely, sequence $S_1$. This results in the full HS-SCCH.

Sequence $S_1$ can be obtained the same way as in the conventional procedure. The channelization code-set bits $X_{ccs}$ are first multiplexed 942 with the modulation scheme bit $X_{ms}$ to form sequence $X_1$. The sequence $X_1$, conventionally 8 bits, is then channel-coded 962 using a convolution code resulting in the sequence $Z_1$, conventionally 48 bits. $Z_1$ is then punctured to give a conventional 40 bits output $R_1$. Next WTRU specific masking 982 is performed. A WTRU-specific masking sequence of 40 bits is exclusively ORed (XORed) with $R_1$, the masking sequence being a function of the WTRU identity $X_{ue}$, specifically the 16-bit H-RNTI. The WTRU specific masking 982 results in a new 40 bit sequence, $S_1$.

While the BS transmission environments described above are described in terms of two carriers using joint HARQ processes, the methods described herein are applicable to multi-carrier operations where a WTRU is configured to operate with more than one carrier, for example, by receiving a configuration message. In the case of multi-carrier operation or when more than 16 HARQ processes are shared, the network may use more than two H-RNTI, or more than two channelization codes to identify the group of HARQ processes, or more than 2 timing configurations, etc.

Alternatively, in another environment, particular carriers may be paired with another carrier and jointly use the HARQ processes. For instance, if 4 carriers are configured, two pairs of two carriers will be configured and allowed to use joint HARQ processes. The addressing of the HARQ processes within the paired carriers may be performed using one of the embodiments described above, such as the H-RNTI, timing, channelization code, introduction of a new HS-SCCH type, NDI, etc. A WTRU with carrier aggregation or multi-carrier configured by higher layers with component carriers 1, 2, . . . N, and with separate PDCCH coding, can take advantage of a joint HARQ entity shared among all configured component carriers, so that retransmission can occur on any of the N component carriers where N is any positive integer. The joint HARQ entity may be composed of N times 8 processes, since there are typically 8 processes per HARQ entity. One method to identify which HARQ processes are being used would be to add a field of $k=\text{floor}(\log_2(N))+1$ bits to an existing DCI format (referred hereafter as HARQ carrier mapping) to associate the retransmission or the initial transmission with the proper HARQ processes.

For example, a new FDD DCI format 1 may be composed of the following bits:

Modulation and coding scheme: 5 bits;
New data indicator: 1 bit;
Redundancy version: 2 bits;
Hybrid ARQ process number: 3 bits;
HARQ carrier mapping: $\text{floor}(\log_2(N))+1$ bits;
Resource block allocation: variable, depends on the downlink cell bandwidth.

In one example embodiment implementing the new format, a WTRU is configured, such as via the receipt of a configuration message, to receive four DL component carriers (D1, D2, D3 and D4) with separate PDCCH coding received on each component carrier. The HARQ carrier mapping may then be two bits. The length of this field may be cell specific based the total number of configurable carriers for that cell or WTRU specific based on the present number of configured carriers for that WTRU. The WTRU may be configured to determine the HARQ carrier mapping, for example, using the following approach, described with respect to component carrier D1, to decode the appropriate PDCCH:

(1) Search in WTRU-specific search space of component carrier D1 PDCCH candidates and decode PDCCH with corresponding DCI format based on new DCI format length with new HARQ;

(2) Upon positive CRC check of candidate PDCCH with WTRU-specific cell radio network temporary identity (C-RNTI), the WTRU decodes associated PDCCH containing the new DCI format 1. The combination of HARQ carrier mapping field and Hybrid ARQ process number field maps to the appropriate 4 times 8 joint HARQ processes.

In an example of another embodiment, where the cell (C)-RNTI matches the PDCCH candidate, there is no need to change the DCI format. A WTRU with carrier aggregation may be configured by higher layers with component carriers 1, 2, . . . N, with separate PDCCH coding. The WTRU may be assigned with C-RNTI_1, C-RNTI_2, . . . , C-RNTI_N. If a PDCCH candidate is received on one of the configured carriers, and matches one of the addresses, the matching C-RNTI address combined with the Hybrid ARQ process field value would uniquely indicate the process to be used for the joint Hybrid ARQ of N times 8 processes.

In an example of another embodiment, the timing of the received data, similar to the embodiment described above, can also be used as an implicit additional information to determine the sub-set of the used HARQ processes. The timing combined with the HARQ process field value may uniquely indicate the process to be used for the joint Hybrid ARQ.

In an example of an alternative embodiment, a WTRU may be configured to take advantage of one or more joint HARQ entities, each entity covering a subset of all configured component carriers. In particular, a given component carrier can be paired with another component carrier and use a joint HARQ entity of 16 processes (two times 8 processes). The network may configure the component carrier pairing by maximizing the frequency distance between paired component carriers. In implementation of this example, a WTRU with carrier aggregation may be configured with component carriers D1, D2, ... DN, and may have component carrier D1 paired with D3, D2 paired with D4, ..., D(N−2) with DN. With this implementation, only one additional bit may be required to define with which HARQ process the initial transmission or retransmission is associated. This may be implemented by increasing the Hybrid ARQ process field by one bit in DCI formats and by pairing semi-statically each configured component carriers by higher layers. Alternatively, the address of the HARQ processes within the paired component carriers can also be determined without a change in the DCI format, by making use of the implicit method of configuring two C-RNTIs per paired component carriers or alternatively by making use of the timing of the received data. Therefore, the matching C-RNTI address of the paired component carriers combined with the Hybrid ARQ process field value would uniquely indicate the process to be used for the joint Hybrid ARQ of 2 times 8 processes. Even though the example provided herein, includes pairing of component carriers by two, it is understood that component carriers can also be combined in groups higher than two, and the methods described above are still applicable.

In another embodiment, separate HARQ entities associated to their respective component carriers are paired together forming a joint HARQ entity. An implicit association to the joint HARQ processes is based on whether the received PDCCH is for an initial transmission or a retransmission and based on the component carrier on which the PDCCH was received. For example, one rule may be that initial transmissions are associated with a first set of 8 HARQ processes, 1-8, if received on the lowest component carrier frequency, and those received on the second component carrier are associated with a second set of 8 HARQ processes, 9-16. In contrast, all retransmissions may be associated with the HARQ process of the paired component carrier, i.e., PDCCH received on the lowest frequency component carrier are associated with HARQ processes from 9 to 16.

In an example implementation, a WTRU is configure to operate with N component carriers with joint PDCCH coding that includes the HARQ carrier mapping, as described in above, in each carrier specific DCI format. This field, in combination with HARQ process in the common DCI format, may uniquely define the joint HARQ process, N times 8 processes.

In another embodiment, a WTRU with joint PDCCH coding may be configured to also pair component carriers together to reduce the HARQ carrier mapping size, or to employ implicit rules defining which HARQ process should be used for initial transmission and retransmission as described above.

The methods described herein may be used and/or implemented individually or in any combination. For instance, the method for identifying a subset or a group of joint HARQ processes with a WTRU ID may be used in combination with other methods, such as an additional bit signaled in the control channel or timing or channelization code. For instance, a configured WTRU ID may identify a group of 16 HARQ processes, when 32 HARQ processes are jointly used, and one additional information such as timing, channelization code, etc. may further address a subset of 8 HARQ processes within the 16 HARQ processes. Additionally, the HARQ process field signaled in the control channel may further uniquely identify the HARQ process identity within a final 8 HARQ processes. The combinations of the embodiment are not limited to the examples provided.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A wireless transmit/receive unit (WTRU) comprising:
receiver configured to receive a first downlink control information (DCI) format that is legacy DCI format that does not include component carrier information;
the receiver further configured to receive a configuration message that indicates that the WTRU is to receive a second DCI format indicating a component carrier; and
the receiver is further configured to receive a HARQ transmission over the indicated component carrier of the second DCI format.

2. The WTRU of claim 1 wherein a physical downlink control channel (PDCCH) search space is associated with the second DCI format.

3. The WTRU of claim 2 wherein the PDCCH search space is a WTRU specific search space.

4. A method for receiving downlink control information at a wireless transmit/receive unit (WTRU), the method comprising:

receiving a first DCI format that is legacy DCI format that does not include component carrier information;

receiving a configuration message that indicates that the WTRU is to receive a second DCI format indicating a component carrier; and receiving a HARQ transmission over the indicated component carrier of the second DCI format.

5. The method of claim 4 wherein a physical downlink control channel (PDCCH) search space is associated with the second DCI format.

6. The method of claim 5 wherein a PDCCH search space is associated with the at least one second DCI format.

7. The method of claim 5 wherein the PDCCH search space is a WTRU specific search space.

8. An evolved NodeB (eNB) comprising:

a transmitter configured to transmit a first downlink control information (DCI) format that is legacy DCI format that does not include component carrier information;

the transmitter further configured to transmit a configuration message that indicates that a wireless transmit/receive unit (WTRU) is to receive a second DCI format indicating a component carrier; and the transmitter further configured to transmit a HARQ transmission over the indicated component carrier of the second DCI format.

9. The eNB of claim 8 wherein the at least one circuit transmits the DCI in a physical downlink control channel (PDCCH) search space associated with the at least one second DCI format.

10. The eNB of claim 8 wherein the PDCCH search space is a WTRU specific search space.

* * * * *